(12) United States Patent  
Shibata et al.

(10) Patent No.: US 8,116,946 B2
(45) Date of Patent: Feb. 14, 2012

(54) ELECTRIC POWER STEERING DEVICE

(75) Inventors: Yoshiyuki Shibata, Toyota (JP); Jiro Nakano, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 389 days.

(21) Appl. No.: 12/514,157

(22) PCT Filed: Nov. 9, 2007

(86) PCT No.: PCT/JP2007/071793
§ 371 (c)(1),
(2), (4) Date: May 8, 2009

(87) PCT Pub. No.: WO2008/056771
PCT Pub. Date: May 15, 2008

(65) Prior Publication Data
US 2010/0042295 A1     Feb. 18, 2010

(30) Foreign Application Priority Data

Nov. 10, 2006 (JP) ................................ 2006-305537
Nov. 27, 2006 (JP) ................................ 2006-318678

(51) Int. Cl.
*B62D 5/04* (2006.01)
(52) U.S. Cl. .......................................... 701/41; 180/444
(58) Field of Classification Search ................ 701/41, 701/42, 43; 180/443, 444, 446
See application file for complete search history.

(56) References Cited

U.S. PATENT DOCUMENTS

| | | | |
|---|---|---|---|
| 5,033,565 A * | 7/1991 | Abukawa et al. | 180/443 |
| 5,670,854 A | 9/1997 | Matsuura et al. | |
| 5,701,066 A | 12/1997 | Matsuura et al. | |
| 7,004,280 B2 * | 2/2006 | Shirato et al. | 180/446 |
| 7,163,080 B2 * | 1/2007 | Fardoun et al. | 180/446 |
| 7,793,755 B2 * | 9/2010 | Ogasawara | 180/446 |
| 2005/0257992 A1 | 11/2005 | Shiino et al. | |

FOREIGN PATENT DOCUMENTS

| | | |
|---|---|---|
| EP | 1 375 300 A2 | 1/2004 |
| EP | 1 375 300 A3 | 1/2004 |
| JP | 8 164863 | 6/1996 |
| JP | 2001 63602 | 3/2001 |
| JP | 2003 324867 | 11/2003 |
| JP | 2004 82798 | 3/2004 |
| JP | 2004 508792 | 3/2004 |
| JP | 2005 186775 | 7/2005 |
| JP | 2005 247214 | 9/2005 |
| JP | 2005 297718 | 10/2005 |
| JP | 2006 117015 | 5/2006 |
| JP | 2006 121821 | 5/2006 |
| WO | WO 2006/138209 | 12/2006 |

* cited by examiner

*Primary Examiner* — Kevin Hurley
(74) *Attorney, Agent, or Firm* — Oblon, Spivak, McClelland, Maier & Neustadt, L.L.P.

(57) ABSTRACT

An electric power steering (EPS) device including a rack actuator that applies assist force to a rack shaft, a column actuator that applies assist force to a column shaft, and an ECU that controls operation of the actuators by supplying drive power to motors, each of which is a drive source of the corresponding one of the actuators. A permanent magnet motor (BLDC) is employed as the motor of the rack actuator and an induction motor, which is a non-permanent magnet motor, is used as the motor of the column actuator.

9 Claims, 8 Drawing Sheets

ELECTRIC POWER STEERING DEVICE

FIELD OF THE INVENTION

The present invention relates to an electric power steering device having a plurality of motors.

BACKGROUND OF THE INVENTION

Conventionally, an electric power steering device (EPS) having a motor as a drive source is known as a power steering device for a vehicle. Compared to hydraulic power steering devices, the EPS characteristically enables flexible layout and reduces energy consumption. Accordingly, use of the EPS is now considered in not only small-sized vehicles but also large-sized vehicles. As a result, corresponding improvement is strongly demanded in the output performance of the EPS.

However, there is actually only a limited space for installing an EPS actuator in a vehicle. Particularly, if the EPS is a rack type or a pinion type, it is practically impossible to accommodate a large-sized motor. Further, in the case of a column type EPS, which occupies a relatively small space, the weight of the device is disadvantageously increased by reinforcing a steering shaft in such a manner as to meet increase of output.

To solve these problems, it is demanded to provide an EPS that increases output while avoiding problems related to limited installation space and weight increase, and ensures both redundancy and high reliability. In this regard, an EPS employing two motors has been proposed (see, for example, Patent Document 1). One of the motors applies assist force to a rack shaft and the other applies assist force to a steering shaft. Also, since EPS's are now used in a wider variety of vehicles, improved qualities are demanded in the devices. Particularly, an extremely high standard is demanded for quietness of operation. To meet this demand, for example, an EPS that carries out compensation control to inhibit influence of a torque ripple caused by erroneous detection of a sensor or an EPS that reduces cogging torque of a motor has been proposed (see, for example, Patent Documents 2 or 3).

Patent Document 1: Japanese Laid-Open Patent Publication No. 2004-82798
Patent Document 2: Japanese Laid-Open Patent Publication No. 2005-186775
Patent Document 3: Japanese Laid-Open Patent Publication No. 2003-324867

Conventionally, in many cases, to meet demand for a small-sized and higher output EPS, the EPS employs, as a motor serving as a drive source, a permanent magnet motor having permanent magnets, such as a brushless motor (a BLDC motor), for a rotor. However, the permanent magnet motor has an essential problem, which is cogging torque. The influence of the cogging torque on steering feel becomes greater as the output of the EPS becomes greater. This problem cannot be solved even if a plurality of motors are mounted in the EPS, as long as the permanent magnet motor serves as the drive source. Also, if multiple motors are employed, it is important to match the control phases of the motors. However, in the EPS in which one of the motors operates to assist the rack shaft and the other operates to assist the steering shaft, it is difficult to match the control phases of the two motors due to torsion of the steering shaft. This may cause interference between control of one motor with control of the other, thus deteriorating the steering feel together with the togging torque.

SUMMARY OF THE INVENTION

Accordingly, it is an objective of the present invention to provide an electric power steering device that responds to increased output and ensures improved steering feel.

To achieve the foregoing object and in accordance with a first aspect of the present invention, an electric power steering device is provided that includes a first steering force assist device that applies an assist force to a rack shaft to assist steering, a second steering force assist device that applies the assist force to a steering shaft, and control means that controls operation of each of the steering force assist devices by supplying drive power to a motor that drives the steering force assist device. A first motor that drives the first steering force assist device is a permanent magnet motor. A second motor that drives the second steering force assist device is a non-permanent magnet motor.

In the above configuration, it is preferable that the second steering force assist device be provided in a column shaft configuring the steering shaft.

The non-permanent magnet motor, characteristically, is free from cogging torque and does not easily cause a torque ripple when rotated at a low speed. The above-described configurations are thus capable of responding to increased output while inhibiting increase of the cogging torque. Particularly, by employing the non-permanent magnet motor as the drive source of the second steering force assist device by which change of motor torque is easily reflected in the steering feel, that is, the steering force assist device that applies the assist force to the steering shaft, further desirable steering feel is ensured. This effect is more pronounced in the steering force assist device that applies the assist force to a column shaft, which is located closer to the steering system. Also, the size of the non-permanent magnet motor does not easily cause a problem in a steering column, which occupies a relatively small installation space. Further, the non-permanent magnet motor is free from a regenerative braking effect. Accordingly, unlike a permanent magnet motor (such as a BLDC motor), which is often used in the electric power steering device, it is unnecessary to provide an expensive phase opening relay in order to prepare for malfunctions due to a phase-locked energization. The phase opening relay is thus omitted, which saves the cost. Also, by applying the assist force to the rack shaft by the permanent magnet motor, which is small-sized and produces high torque characteristically, direct steering feel is brought about.

In the above configuration, it is preferable that the non-permanent magnet motor used in the second steering force assist device be set to a high rotation type compared to the permanent magnet motor used in the first steering force assist device, and that the permanent magnet motor be set to a high torque type compared to the non-permanent magnet motor.

This configuration ensures a wider range of assist force characteristics. Further, the characteristics of the permanent magnet motor and the characteristics of the non-permanent magnet motor are emphasized, thus ensuring further desirable steering feel.

In the above configuration, it is preferable that, if a required assist force is in an achievable range of the first steering force assist device, the control means control the steering force assist devices in such a manner that the first steering force assist device applies the assist force to the rack shaft.

If the assist force is applied to the rack shaft and the steering shaft by the two steering force assist devices simultaneously, control of one of the devices may interfere with control of the other device. Such interference of control is inhibited by applying basic assist force through one of the steering force assist devices. Further, as in the above-described configuration, weight increase caused by reinforcement of the steering shaft is avoided if application of the basic assist force to the rack shaft is employed. Also, by using the second steering force assist device that has the non-permanent magnet motor as the drive source as an auxiliary device, problems such as the regenerative braking effect or the cogging torque, which occur when the motor of the steering force assist device is rotated, are solved.

The above configuration preferably includes determination means that determines a state of the steering, and it is preferable that, if the steering is a reverse steering and a required assist force is in an achievable range of the second steering force assist device, the control means control the steering force assist devices in such a manner that the second steering force assist device applies the assist force to the steering shaft.

Specifically, if the permanent magnet motor is employed as the drive source and the state of steering corresponds to the "reverse steering", a pronounced influence of the torque ripple on the steering feel is easily caused. Accordingly, when the steering is the "reverse steering", more desirable steering feel is brought about by applying the assist force by means of the second steering force assist device that has the non-permanent magnet motor, which does not easily cause a torque ripple, as the drive source.

In the above configuration, it is preferable that, if a steering speed is less than or equal to a predetermined speed and a required assist force is in an achievable range of the second steering force assist device, the control means control the steering force assist devices in such a manner that the second steering force assist device applies the assist force to the steering shaft.

Specifically, the permanent magnet motor easily causes a torque ripple in a low rotation speed range. Accordingly, when the motor is in a low range of rotation speed, or steering speed, further desirable steering feel is ensured by applying the assist force using the second steering force assist device having the non-permanent magnet motor, which does not easily cause a torque ripple, as the drive source, as in the above-described configuration.

In the above configuration, it is preferable that the first motor driving the first steering force assist device have a range of the natural vibration different from a range of the natural vibration of the second motor driving the second steering force assist device, and that, if the steering speed of one of the motors is in the range of the natural vibration, the control means intermittently and randomly execute control for decreasing the output of the one of the motors and increasing the output of the other one of the motors.

Specifically, natural vibration of the motor is caused by rotation of torsion of an armature, which is caused by electromagnetic force, together with a rotating magnetic field. Accordingly, the level of vibration is lowered by reducing the drive power supplied to the motor when the motor is in the range of the natural vibration. Further, by carrying out such lowering of the output of the motor intermittently and at randomly in terms of time, the frequency of the vibration is dispersed. This makes it difficult for the occupant to sense vibration of the motor as noise. As a result, vibration caused by the range of the natural vibration is inhibited and quietness of operation is improved.

In the above configuration, it is preferable that the control means minimize the output ratio of the motor of a steering speed that is in the range of the natural vibration, and maximizes the output ratio of the other one of the motors. The above-described configuration further effectively inhibits vibration caused by the range of the natural vibration.

In the above configuration, the first motor driving the first steering force assist device has a range of the natural vibration different from a range of the natural vibration of the second motor driving the second steering force assist device. It is preferable that, if a steering speed of one of the motors is in the range of the natural vibration, the control means control the steering force assist devices in such a manner that the assist force is applied by using the other motor as a drive source. The above-described configuration inhibits vibration caused by the range of the natural vibration.

DETAILED DESCRIPTION OF THE PREFERRED EMBODIMENTS

First Embodiment

A first embodiment of the present invention will now be described with reference to FIGS. 1 to 5.

Figure 1:
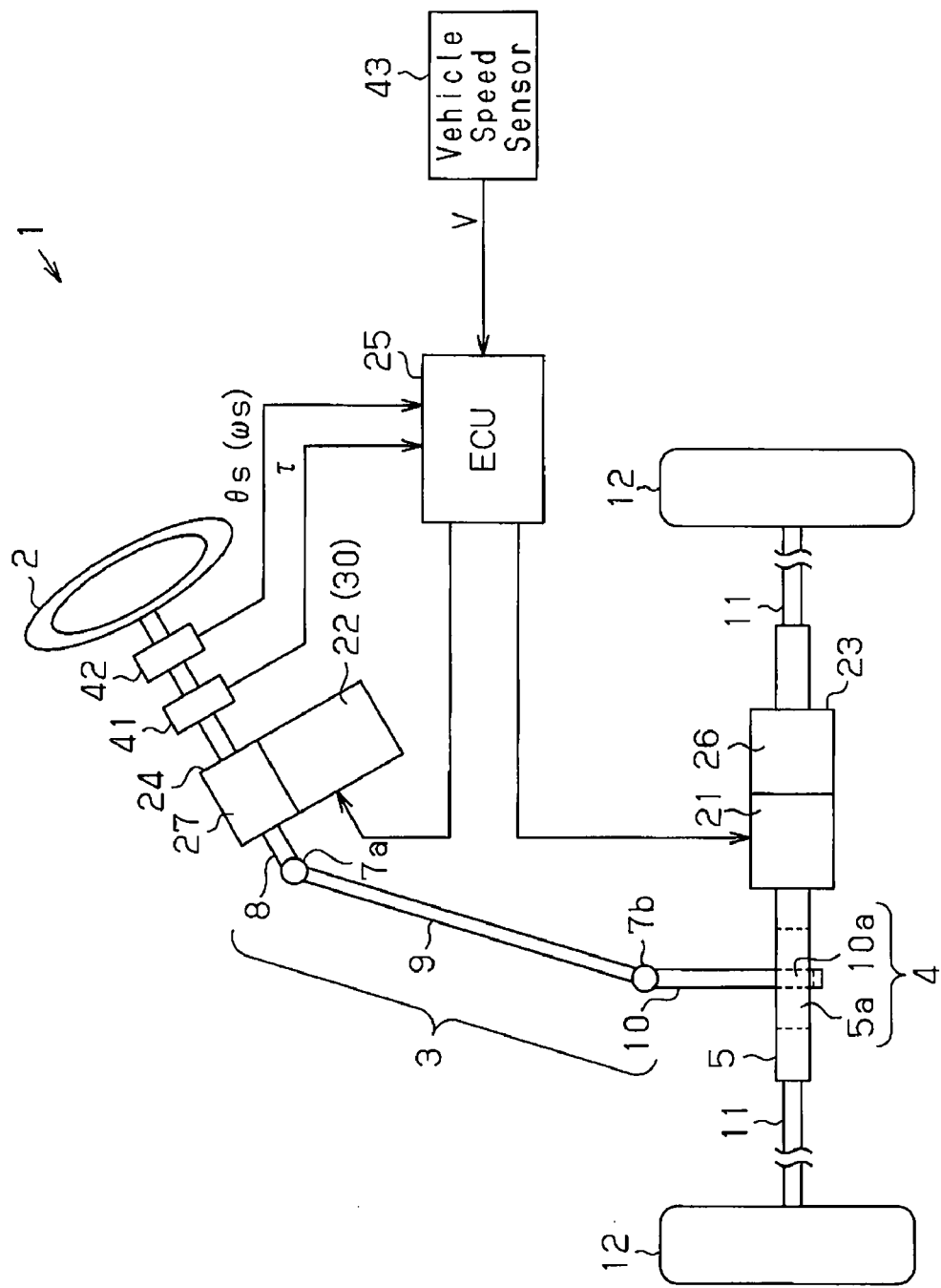
FIG. 1 is a schematic view showing the configuration of an electric power steering device (EPS) according to a first embodiment of the present invention.

As shown in FIG. 1, in an electric power steering device (EPS) 1, a steering wheel 2 is fixed to a steering shaft 3. The steering shaft 3 is connected to a rack shaft 5 through a rack and pinion mechanism 4. Rotation of the steering shaft 3 caused through steering is converted into linear reciprocation of the rack shaft 5 through the rack and pinion mechanism 4. Specifically, a column shaft 8, an intermediate shaft 9, and a pinion shaft 10 are connected together through universal couplings 7a, 7b in the steering shaft 3. In the rack and pinion mechanism 4, pinion teeth 10a formed at one end of the pinion shaft 10 and rack teeth 5a provided in the rack shaft 5 are mutually engaged. A tie rod 11 is connected to each end of the rack shaft 5. The linear reciprocation of the rack shaft 5 is transmitted to a non-illustrated knuckle through the tie rods 11. This changes the steering angle of steerable wheels 12, or the proceeding direction of the vehicle.

The EPS 1 includes two motors 21, 22, each serving as a drive source, so as to apply assist force to the steering system constructed as described above to assist steering. Specifically, the EPS 1 has a rack actuator 23 that applies assist force to the rack shaft 5 using the motor 21, a column actuator 24 that applies assist force to a column shaft 8 using the motor 22, and an ECU 25 (control means) that controls operation of each actuator by supplying drive power to the corresponding motor 21, 22.

The rack actuator 23 serving as a first steering force assist device includes a motor 21 serving as a first motor. The motor 21 is a brushless motor (a BLDC motor) having permanent magnets in a rotor (not shown). The rack actuator 23 converts torque of the motor 21 to axial movement of the rack shaft 5 through a ball screw 26 and thus applies the assist force to the rack shaft 5. This rack assist type EPS is disclosed, for example, in Japanese Laid-Open Patent Publication No. 2006-21581.

The column actuator 24, or a second steering force assist device, includes a motor 22 serving as a second motor and a speed varying mechanism (formed by a worm and a wheel) 27. The column actuator 24 applies the assist force to the column shaft 8 (the steering shaft 3) by transmitting torque of the motor 22 to the column shaft 8 through the speed varying mechanism 27.

Figure 2:
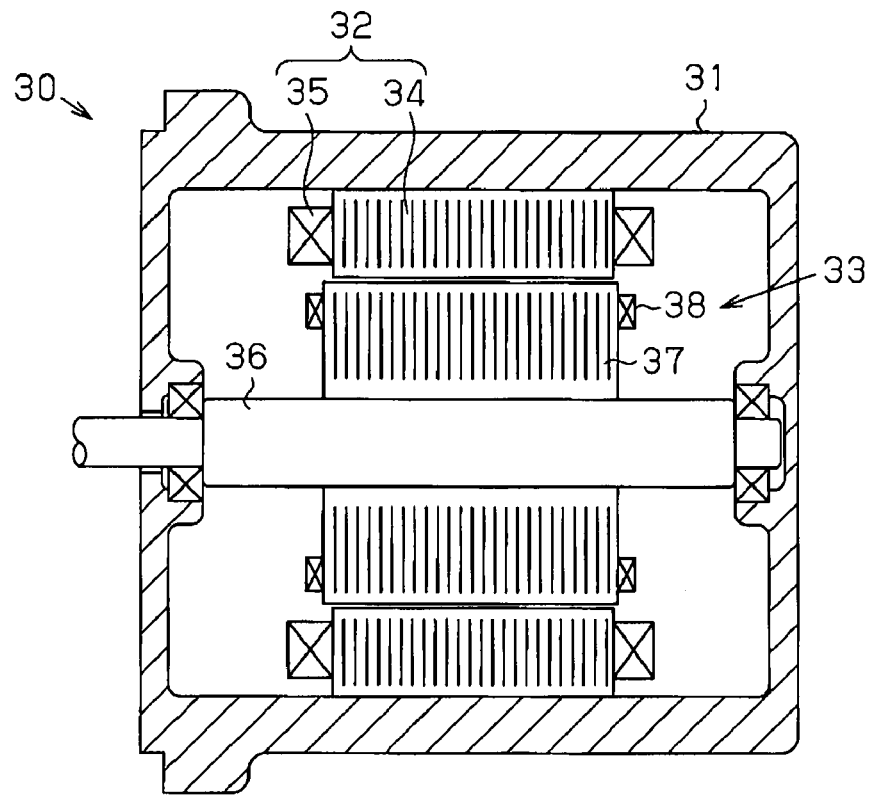
FIG. 2 is a schematic view showing the configuration of an induction motor.

The motor 22 of the column actuator 24 is an induction motor 30, which is illustrated in FIG. 2. With reference to FIG. 2, the induction motor 30 includes a stator 32, which is fixed to the inner circumference of a housing 31, and a rotor 33, which is arranged inward from the stator 32 and supported rotatably. The stator 32 is formed by iron stator cores 34 and stator coils 35 each wound around the corresponding iron stator cores 34. The rotor 33 is configured by a rotary shaft (an output shaft) 36 and an iron rotor core 37 and a rotor coil (a basket-shaped coil) 38, which are fixed to the outer circumference of the rotary shaft 36. In other words, the induction motor 30 is a non-permanent magnet motor, which has no permanent magnet. In the induction motor 30, a rotating magnetic field is generated by supplying a primary electric current (a three-phase alternating current) to the stator coils 35. This causes an induction current in the rotary coil 38 in the rotating magnetic field, thus producing rotational torque.

The non-permanent magnet motor, such as the induction motor 30, characteristically produces no cogging torque and inhibits a torque ripple when rotating at a low speed. In the present embodiment, the induction motor 30 is employed as the drive source of the column actuator 24, by which change of motor torque is easily reflected in steering feel. This ensures desirable steering feel while responding to output increase.

As shown in FIG. 1, a torque sensor 41 and a steering sensor 42, which are mounted on the steering shaft 3 (the column shaft 8), and a vehicle speed sensor 43 are connected to the ECU 25. In correspondence with state quantities detected by these sensors, the ECU 25 controls the operation of the rack actuator 23 and the operation of the column actuator 24. Specifically, the ECU 25 determines a target assist force and control target of outputs of the actuators based on the steering torque $\tau$ detected by the torque sensor 41, the vehicle speed V detected by the vehicle speed sensor 43, and the steering angle $\theta s$ and the steering speed $\omega s$ detected by the steering sensor 42. In order to cause the rack actuator 23 and the column actuator 24 to output the determined assist force, the ECU 25 supplies drive power to the motors 21, 22.

Assist control of the EPS 1 will hereafter be explained with reference to FIG. 3.

Figure 3:
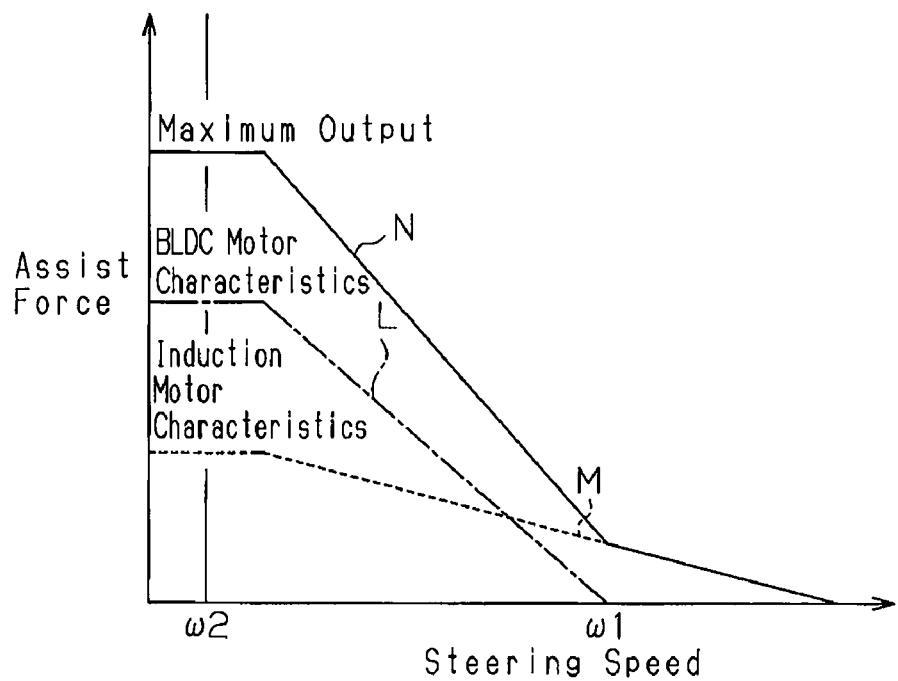
FIG. 3 is a graph representing motor characteristics and output characteristics of the EPS of the first embodiment.

As indicated by the single-dotted chain line L in FIG. 3, the motor 21 (the BLDC motor) of the rack actuator 23 is set as a low-rotation and high-torque type. As indicated by the chain line M in FIG. 3, the motor 22 (the induction motor 30) of the column actuator 24 is set to a high-rotation and low-torque type compared to the motor 21. The change gear ratio of the rack actuator 23 is different from that of the column actuator 24. Accordingly, the rotation speed of each of the motors 21, 22 in FIG. 3 is represented by values obtained through conversion into the rotation speed of the steering shaft 3, or the steering speed $\omega s$. In the present embodiment, if the required assist force exceeds the achievable range of the rack actuator 23, which is the main actuator, the assist force produced by the column actuator 24, or the sub actuator, is added to the assist force generated by the rack actuator 23, in such a manner as to provide the output characteristics indicated by the solid lines N of FIG. 3.

If the two actuators 23, 24 apply the assist force to the rack shaft 5 and the steering shaft 3 simultaneously, as has been described, control of the actuator 23 and control of the actuator 24 may interfere mutually. However, such interference of control is avoided by applying basic assist force only by one of the actuators. In the present embodiment, since the basic assist force is applied by the rack actuator 23, weight increase of the steering shaft 3 caused by reinforcement of the steering shaft 3 is avoided. Further, since the column actuator 24 having the induction motor 30 serving as the drive source is employed as the sub actuator, problems such as regenerative braking effect and cogging torque, which may be brought about when the motor is rotated, are solved.

Also, if it is advantageous to apply assist force through the column actuator 24 having the induction motor 30 in correspondence with the state of steering (the steering state), the assist force is provided by the column actuator 24 on an exceptional basis.

A procedure of the assist control by the EPS 1 will hereafter be described.

Figure 4:
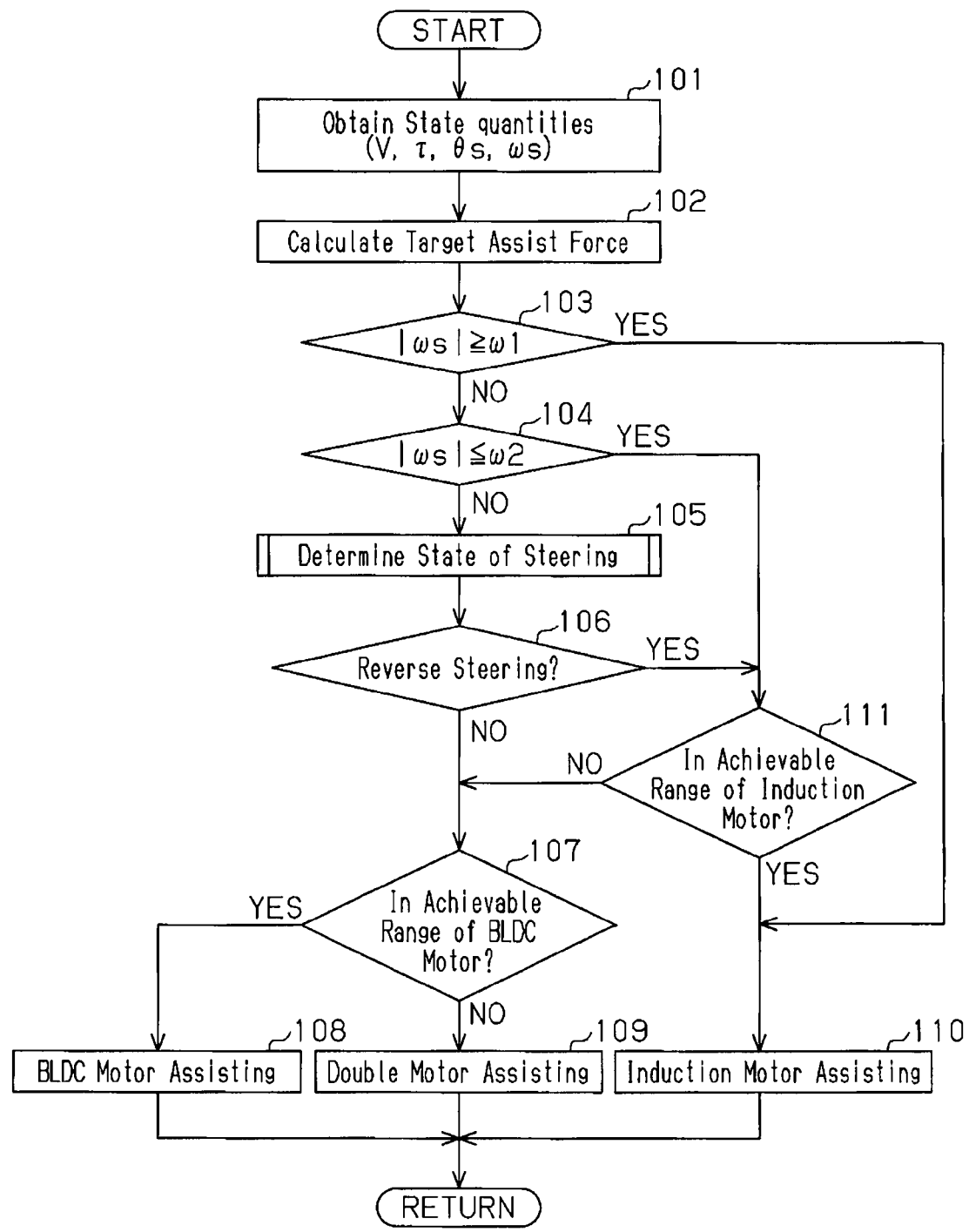
FIG. 4 is a flowchart representing assist control by the EPS of the first embodiment.

As illustrated in the flowchart of FIG. 4, the ECU 25 obtains the vehicle speed V, the steering torque $\tau$, the steering angle $\theta s$, and the steering speed $\omega s$ as the state quantities (step 101). Then, the ECU 25 computes the required assist force, which is the target assist force (step 102). Subsequently, the ECU 25 determines whether (the absolute value of) the steering speed $\omega s$ is greater than or equal to a predetermined speed $\omega 1$ (step 103). If the steering speed $\omega s$ is not greater than or equal to the speed $\omega 1$ ($|\omega s|<\omega 1$, step 103: NO), the ECU 25 determines whether (the absolute value of) the steering speed $\omega s$ is less than or equal to a predetermined speed $\omega 2$ (step 104). If the steering speed $\omega s$ is not less than or equal to the speed $\omega 2$ ($|\omega s|>\omega 2$, step 104: NO), the ECU 25 performs a procedure of determining a current steering state (step 105).

There are three types of operations in steering by the driver, which are "further steering" by which (the absolute value of) the current steering angle $\theta s$ is increased, "reverse steering" by which the current steering angle $\theta s$ is decreased, and "holding steering" by which the current steering angle $\theta s$ is neither increased nor decreased. The ECU 25, or determination means, determines which of steering states the current steering corresponds to.

Figure 5:
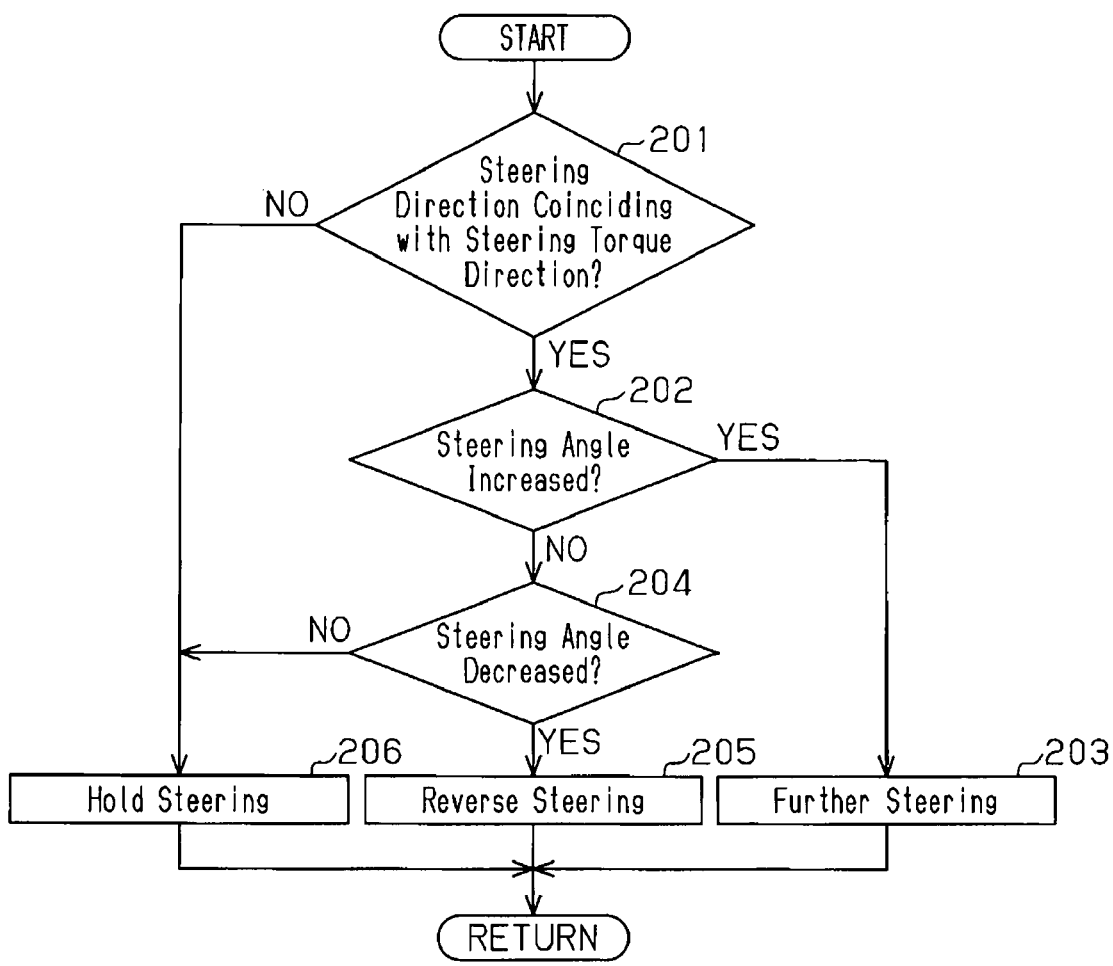
FIG. 5 is a flowchart representing a procedure of steering state determination.

Specifically, as illustrated in FIG. 5, the ECU 25 first determines whether the steering direction (the direction in which the steering angle $\theta s$ changes) is the same as the direction of the steering torque $\tau$ (step 201). If the steering direction and the direction of the steering torque are the same as each other (step 201: YES), the ECU 25 determines whether the steering angle $\theta s$ is increasing (step 202). If the steering angle $\theta s$ is increasing (step 202: YES), the ECU 25 determines that the steering state is the further steering (step 203).

Contrastingly, if the ECU 25 determines that the steering angle $\theta s$ is not increasing (step 202: NO), the ECU 25 determines whether the steering angle $\theta s$ is decreasing (step 204). If the steering angle $\theta s$ is decreasing (step 204: YES), the ECU 25 determines that the steering state is the reverse steering (step 205).

When determining that the steering direction and the direction of the steering torque τ are not the same in step 201 (step 201: NO) or that the steering angle θs is not decreasing in step 204 (step 204: NO), the ECU 25 determines that the steering state is the holding steering (step 206).

After having determined the steering state, the ECU 25 determines whether the determination result is the reverse steering (step 106). When determining that the determination result is not the reverse steering (step 106: NO), the ECU 25 determines whether the target assist force computed in step 102 is in the achievable range of the rack actuator 23. In other words, it is determined whether the required assist force is in such a range that the required assist force is achievable by using only the rack actuator 23 (step 107) as determined from the motor characteristics of the motor 21 (the BLDC motor) (see FIG. 3). If the required assist force is in the achievable range of the rack actuator 23 (step 107: YES), the ECU 25 controls operation of each actuator 23, 24 in such a manner that the rack actuator 23 applies the assist force (BLDC motor assisting, step 108). In contrast, if the required assist force is outside the achievable range of the rack actuator 23 (step 107: NO), the ECU 25 controls operation of each actuator 23, 24 in such a manner that the two actuators apply the assist force (double motor assisting, step 109).

The speed ω1 in step 103 is set to a value in the proximity of the steering speed corresponding to the maximum rotation speed of the motor 21 (the BLDC motor) of the rack actuator 23 (see FIG. 3). If the steering speed ωs is greater than or equal to the speed ω1 in step 103 (|ωs|≧ω1, step 103: YES), the ECU 25 controls operation of each actuator 23, 24 in such a manner that the column actuator 24 having the motor 22 (the induction motor 30) applies the assist force (induction motor assisting, step 110). When the induction motor assisting is being carried out, the motor 21 of the rack actuator 23 is controlled in accordance with phase opening control. This prevents the regenerative braking effect, which is caused when the motor 21 is rotated.

The speed ω2 in step 104 is set to a value in a low speed rotation range in which a torque ripple is easily caused in the motor 21 (the BLDC motor) and in the proximity of the steering speed corresponding to the upper limit of the low speed rotation range (see FIG. 3). If the steering speed ωs is less than or equal to the speed ω2 in step 104 (|ωs|≦ω2, step 104: YES), the ECU 25 determines whether the target assist force is in the achievable range of the column actuator 24 employing the induction motor 30 as the drive source. In other words, the ECU 25 determines whether the required assist force is in the range in which the required assist force is achievable by using only the column actuator 24 (step 111) as determined from the motor characteristics of the motor 22 (the induction motor 30) (see FIG. 3).

When determining that the steering state in step 105 is the reverse steering in step 106 (step 106: YES), the ECU 25 determines whether the target assist force is in the achievable range of the column actuator 24 (step 111). When determining that the required assist force is in the achievable range of the column actuator 24 (step 111: YES), the ECU 25 controls operation of each actuator 23, 24 in such a manner that the column actuator 24 applies the assist force (induction motor assisting, step 110).

When determining that the required assist force is outside the achievable range of the column actuator 24 (step 111: NO), the ECU 25 determines whether the required assist force is in the achievable range of the rack actuator 23. If the required assist force is in the achievable range of the rack actuator 23 (step 107: YES), the ECU 25 controls operation of each actuator 23, 24 in such a manner that the assist force is applied by the rack actuator 23 (BLDC motor assisting, step 108). Contrastingly, if the required assist force is outside the achievable range of the rack actuator 23 (step 107: NO), the ECU 25 controls operation of each actuator 23, 24 in such a manner that the assist force is applied by the two actuators (double motor assisting, step 109).

The present embodiment has the following advantages.

(1) The EPS 1 includes the rack actuator 23 applying the assist force to the rack shaft 5, the column actuator 24 applying the assist force to the column shaft 8, and the ECU 25, which controls operation of each actuator by supplying drive power to the corresponding motor 21, 22, or the drive source of the actuator. The permanent magnet motor (the BLDC motor) is employed as the motor 21 of the rack actuator 23, and the induction motor 30, which is the non-permanent magnet motor, is used as the motor 22 of the column actuator 24.

Characteristically, the non-permanent magnet motor, such as the induction motor 30, produces no cogging torque and inhibits a torque ripple when rotated at a low speed. As a result, the EPS 1, which has been described, inhibits increase of cogging torque and increases output. Particularly, since changes of the motor torque are easily reflected in the steering feel in the column actuator 24, the use of the induction motor 30 as the motor 22, which is the drive source of the column actuator 24, ensures further desirable steering feel. Also, since the steering column occupies a relatively small installation space, the size of the induction motor 30 does not easily cause a problem for the steering column. Further, since the induction motor 30 does not cause the regenerative braking effect, it is unnecessary to employ an expensive phase opening relay, which operates when a failure by a phase-locked energization occurs, unlike the case of the BLDC motor. Use of the induction motor 30 thus saves the cost. Also, by employing the non-permanent magnet motor, such as the BLDC motor, which is characteristically small-sized and outputs high torque, as the motor 21 of the rack actuator 23, direct steering feel is ensured.

(2) The motor 21 (the BLDC motor) of the rack actuator 23 is set to a low-rotation and high-torque type. In contrast, compared to the motor 21, the motor 22 (the induction motor 30) of the column actuator 24 is set to a high-rotation and low-torque type. This configuration ensures a wider range of assist force characteristics. Further, since the configuration pronouncedly brings out the characteristics of the BLDC motor and those of the induction motor 30, further desirable steering feel is ensured.

(3) If two actuators apply assist force to the rack shaft 5 and the steering shaft 3 simultaneously, disadvantageous mutual interference of control of the actuators occurs. However, in the present embodiment, the EPS 1 employs the rack actuator 23 as the main actuator. In other words, if the required assist force is in the achievable range of (the motor 21 of) the rack actuator 23, the ECU 25 basically controls operation of each actuator 23, 24 in such a manner that the assist force is applied by the rack actuator 23. Contrastingly, if the required assist force exceeds the achievable range of the rack actuator 23, the assist force is applied by the column actuator 24, or the sub actuator, in addition to the assist force applied by the rack actuator 23. By applying the basic assist force through one of the actuators, interference of control of the actuators is inhibited. Also, since the basic assist force is applied by the rack actuator 23 as in the present embodiment, increase of the weight of the steering shaft 3 caused by reinforcement of the steering shaft 3 is avoided. Further, since the column actuator 24 having the induction motor 30 as the drive source is employed as the sub actuator, the problems such as the regenerative braking effect and the cogging torque, which are caused when the motor of the sub actuator is rotated, are solved.

(4) Generally, if the BLDC motor is employed as the drive source and the steering state is the reverse steering, a torque ripple influences the steering feel to a great extent. In the first embodiment, the ECU 25 carries out the procedure of determining the state of steering (the steering state), or the steering state determination. If the steering state is the reverse steering and the required assist force is in the achievable range of the column actuator 24, the ECU 25 controls operation of each actuator 23, 24 in such a manner that the assist force is applied by the column actuator 24. In other words, the induction motor 30, which inhibits a torque ripple, is used to apply the assist force when the reverse steering is performed. This ensures further desirable steering feel.

(5) The BLDC motor easily causes a torque ripple in the low rotation speed range, which is disadvantageous. However, in the present embodiment, if the steering speed ωs is less than or equal to the speed ω2 and the required assist force is in the achievable range of the column actuator 24, the ECU 25 controls operation of each actuator 23, 24 in such a manner that the assist force is applied by the column actuator 24. Accordingly, by using the induction motor 30, which inhibits a torque ripple, to apply the assist force in the range in which the rotation speed of the motor, or the steering speed, is low, further desirable steering feel is ensured.

Second Embodiment

A second embodiment of the present invention will hereafter be described with reference to FIGS. 6 to 9. Detailed description of components of the second embodiment that are the same as or like corresponding components of the first embodiment will be omitted.

An EPS employing a motor as a drive source disadvantageously has a range of rotation in which noise specific to the motor easily occurs, or a range of the natural vibration. This problem of the range of the natural vibration cannot be solved by countermeasures involving control or configuration of the motor itself. Accordingly, in order to prevent the vibration generated by the motor from being transmitted to other components, the mounting portion of the motor, for example, has conventionally been constructed to prevent vibration. Considering this, in the EPS 1 of the present embodiment, if the steering speed (the rotation speed) of one of the motors 21, 22 corresponds to the range of the natural vibration and the required assist force is achievable by using only the output of the other motor, the ECU 25 controls operation of each actuator 23, 24 in such a manner that the actuator corresponding to the other motor, which is the drive source of the actuator, applies the assist force.

Specifically, if the steering speed corresponds to the range of the natural vibration (indicated by range a in FIG. 6) of the motor 21 of the rack actuator 23 and the required assist force is in the achievable range (indicated by range α1 in FIG. 6) of the motor 22 of the column actuator 24, the ECU 25 controls operation of each actuator 23, 24 in such a manner that the column actuator 24 solely applies the assist force. If the steering speed corresponds to the range of the natural vibration (indicated by range β in FIG. 6) of the motor 22 of the column actuator 24 and the required assist force is in the achievable range (indicated by range β1 in FIG. 6) of the motor 21 of the rack actuator 23, the ECU 25 controls operation of each actuator 23, 24 in such a manner that the rack actuator 23 solely applies the assist force.

In other words, if the steering speed of one of the motors 21, 22 is in the range of the natural vibration, the EPS 1 operates the other one of the motors 21, 22 to apply the assist force and does not operate the motor with the steering speed in the range of the natural vibration as long as possible. This inhibits vibration caused by the range of the natural vibration.

If the steering speed of one of the motors 21, 22 is in the range of the natural vibration and the required assist force exceeds the achievable range of the other motor, the EPS 1 executes intermittently and randomly in terms of time control for decreasing the output of the motor with the steering speed in the range of the natural vibration and increasing the output of the other motor while maintaining the total output of the motors 21, 22 constant (random switch control).

Figure 6:
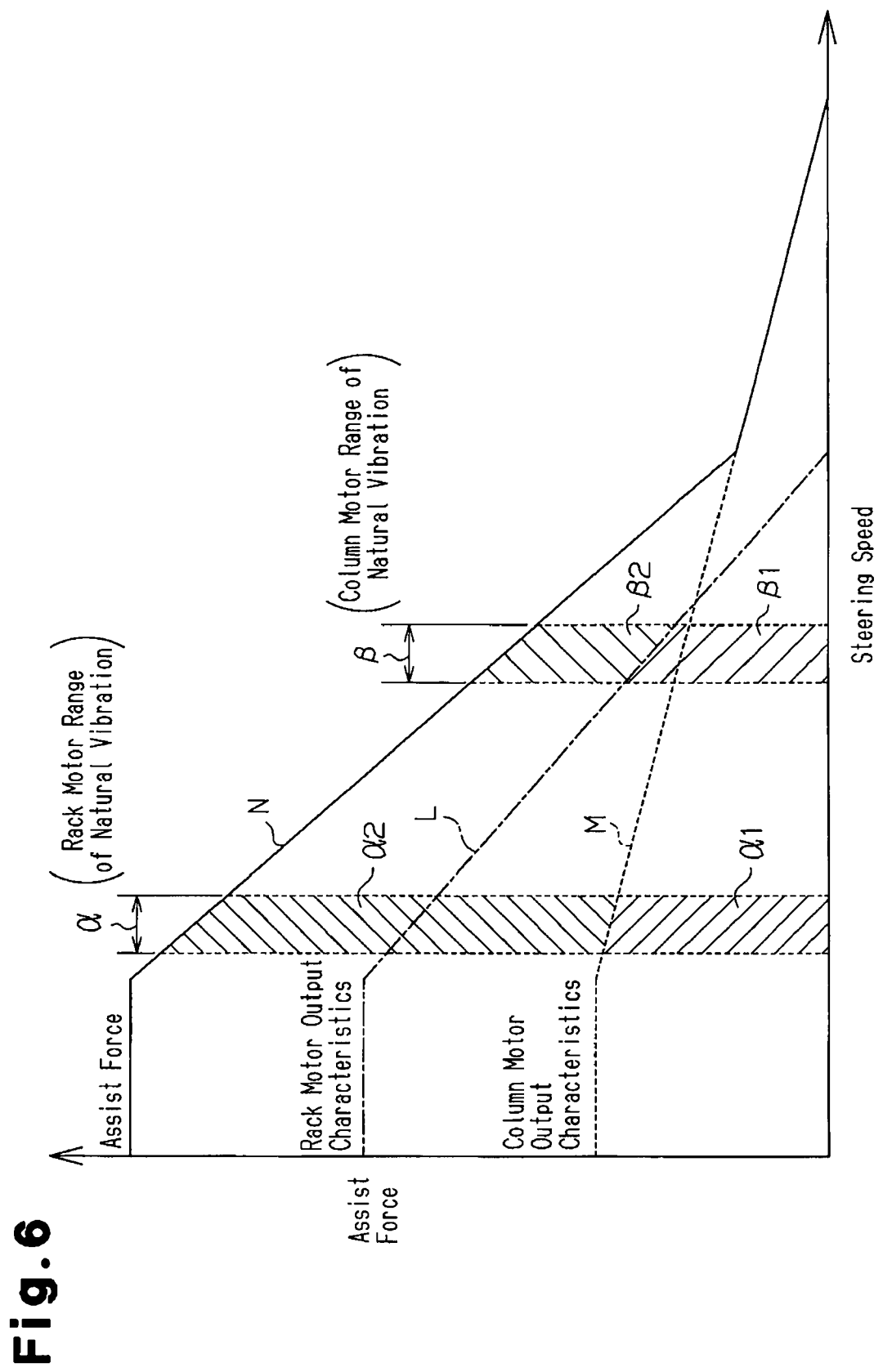
FIG. 6 is a graph representing motor characteristics and output characteristics of an EPS according to a second embodiment of the invention.
Figure 7:
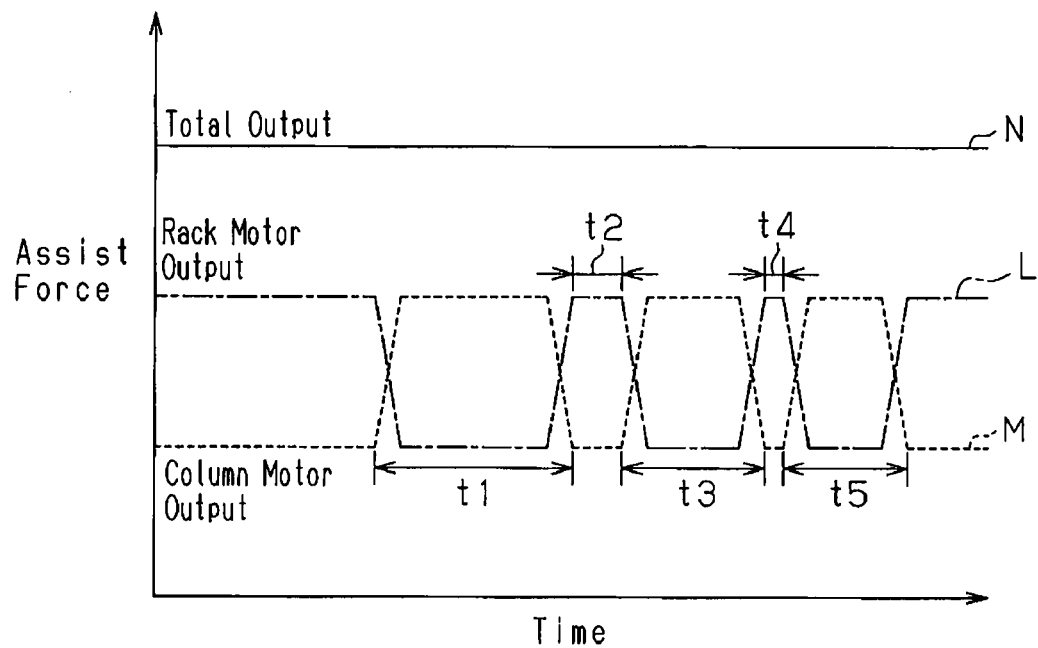
FIG. 7 is a graph representing random switch control performed if the steering speed is outside an achievable range of a motor in a column.

Specifically, if the steering speed of the motor 21 in the rack is in the range of the natural vibration and the required assist force exceeds the achievable range of the motor 22 in the column as indicated by area α2 in FIG. 6, the ECU 25 executes intermittently and randomly in terms of time control for decreasing the output of the motor 21 in the rack and increasing the output of the motor 22 in the column (random switch control A) as illustrated in FIG. 7.

Figure 8:
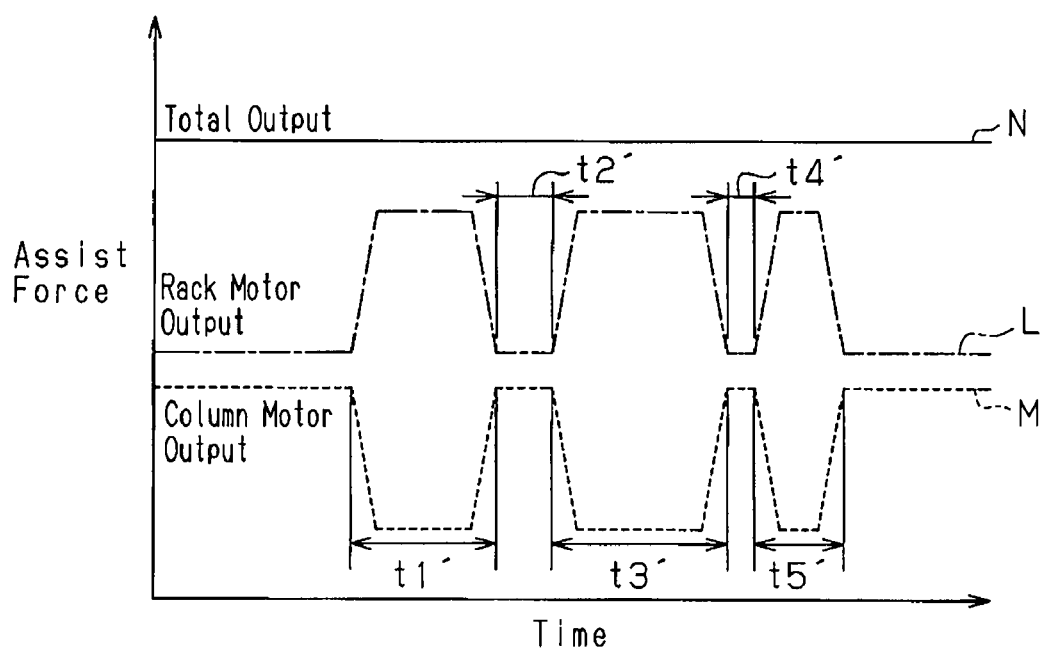
FIG. 8 is a graph representing random switch control performed if the steering speed is outside an achievable range of a motor in a rack.

Similarly, if the steering speed of the motor 22 in the column is in the range of the natural vibration and the required assist force exceeds the achievable range of the motor 21 in the rack, as indicated by area β2 in FIG. 6, the ECU 25 intermittently and randomly in terms of time executes control for decreasing the output of the motor 22 in the column and increasing the output of the motor 21 in the rack, as illustrated in FIG. 8 (random switch control B).

In the respective random switch controls, the ECU 25 intermittently executes control for lowering the output of one of the motors 21, 22 with the steering speed that is in the range of the natural vibration and increasing the output of the other motor correspondingly, while maintaining the constant total output of the motor 21 in the rack and the motor 22 in the column. At this stage, the output ratio of the motor of a steering speed that is in the range of the natural vibration (with respect to the total output) is minimized in such a range that the total output of the motors is maintained constant, and the output ratio of the other motor is maximized. The time points t1 (t1'), t3 (t3'), and t5 (t5'), at which such decrease of the output of one motor and increase of the output of the other motor are carried out, and time intervals t2 (t2') and t4 (t4') of these time points are randomly set.

Natural vibration of a motor is caused by rotation of torsion of a stator (an armature) brought about by electromagnetic force together with a rotating magnetic field. Accordingly, by reducing the drive power supplied to the motor when the motor is in the range of the natural vibration, vibration of the motor is decreased. Further, by intermittently and randomly decreasing the output of the motor in terms of time, the frequency of vibration of the motor is dispersed. This prevents the occupant of the vehicle from sensing the vibration as noise. Using such principle, the EPS 1 of the present embodiment enhances quietness of operation.

A procedure of assist control by the EPS 1 will be explained in the following.

Figure 9:
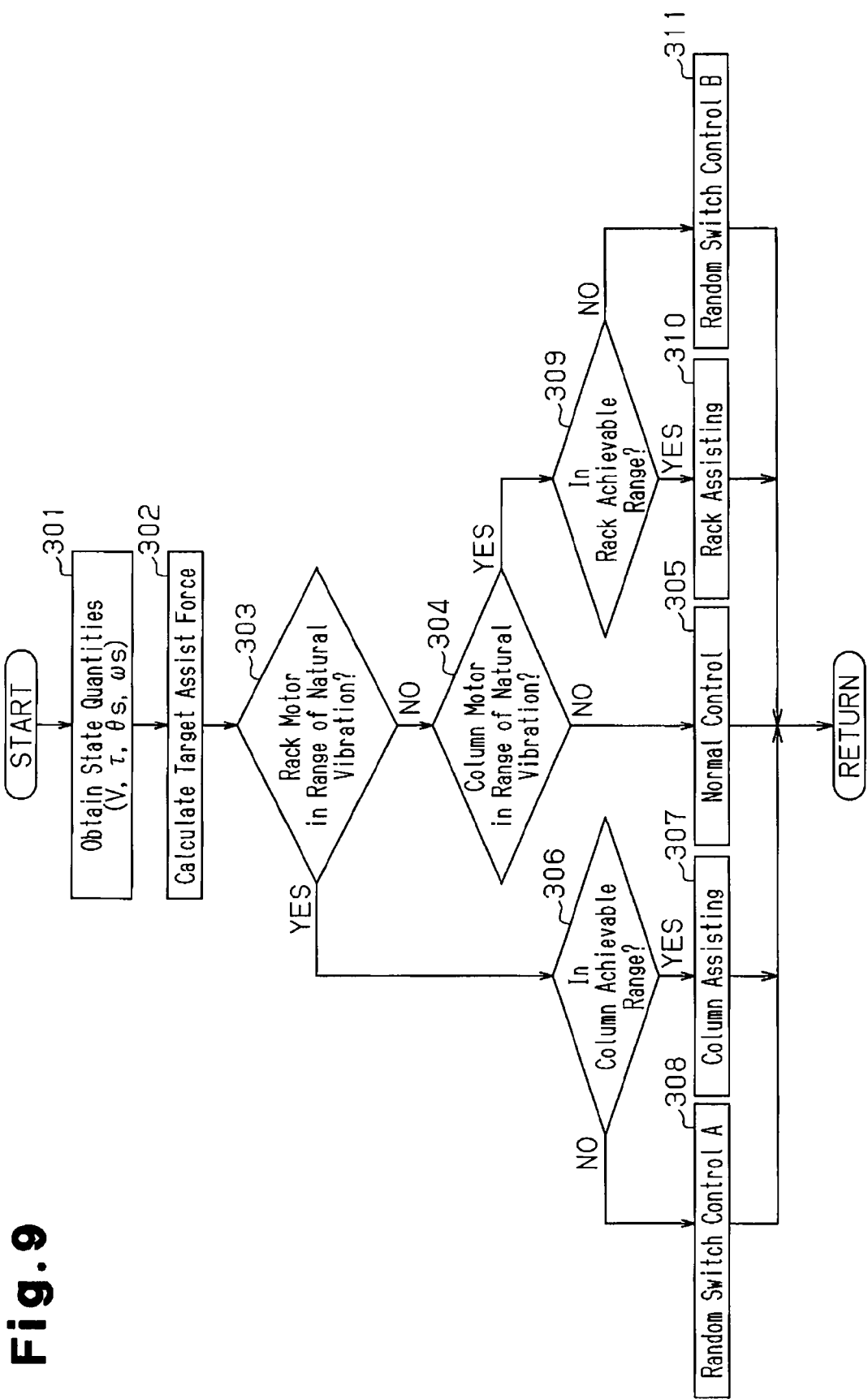
FIG. 9 is a flowchart representing assist control by the EPS of the second embodiment.

As illustrated in the flowchart of FIG. 9, the ECU 25 obtains the vehicle speed V, the steering torque τ, the steering angle θs, and the steering speed ωs as the state quantities (step 301). The ECU 25 then calculates the required assist force, or the target assist force (step 302). Subsequently, the ECU 25 determines whether the steering speed ωs is in the range of the natural vibration of the motor 21 in the rack (step 303). If the steering speed ωs is outside the range of the natural vibration of the motor 21 in the rack (step 303: NO), the ECU 25 determines whether the steering speed ωs is in the range of the natural vibration of the motor 22 in the column (step 304). If the steering speed ωs is outside the range of the natural vibration of the motor 21 in the column (step 304: NO), the ECU 25 controls operation of the rack actuator 23 and that of the column actuator 24 in such a manner that the assist force is applied in accordance with a predetermined ratio corresponding to the output characteristics of the motor 21 and those of the motor 22 (normal control, step 305).

In contrast, when determining that the steering speed ωs is in the range of the natural vibration of the motor 21 in the rack (step 303: YES), the ECU 25 determines whether the required assist force is in the achievable range of the motor 22 in the column (step 306). If the steering speed ωs is in the achievable range of the motor 22 in the column (step 306: YES), the ECU 25 controls operation of each actuator 23, 24 in such a manner that the motor 22 applies the assist force (column assisting, step 307). Contrastingly, if the steering speed ωs is outside the achievable range of the motor 22 in the column (step 306: NO), the ECU 25 performs the random switch control A. Specifically, the ECU 25 intermittently and randomly in terms of time executes control for lowering the output of the motor 21 in the rack and increasing the output of the motor 22 in the column (see FIG. 7, step 308).

When determining that the steering speed ωs is in the range of the natural vibration of the motor 22 in the column (step 304: YES), the ECU 25 determines whether the required assist force is in the achievable range of the motor 21 in the rack (step 309). If the required assist force is in the achievable range of the motor 21 in the rack (step 309: YES), the ECU 25 controls operation of each actuator 23, 24 in such a manner that the motor 21 applies the assist force (rack assisting, step 310). In contrast, if the steering speed ωs is outside the achievable range of the motor 21 in the rack (step 309: NO), the ECU 25 performs the random switch control B. Specifically, the ECU 25 intermittently and randomly in terms of time executes control for lowering the output of the motor 22 in the column and increasing the output of the motor 21 in the rack (see FIG. 8, step 311).

The present embodiment has the following advantages.

(1) The EPS 1 has the two motors 21, 22, each of which serves as a drive source, to generate the assist force that is applied to the steering system to assist in steering. If the steering speed ωs of one of the motors 21, 22 is in the range of the natural vibration and the required assist force exceeds the achievable range of the other motor, the ECU 25 intermittently and at randomly in terms of time executes control for decreasing the output of one of the motors 21, 22 and increasing the output of the other motor while maintaining the total output of the motors 21, 22 constant (the random switch control). If the ECU 25 intermittently and periodically executes control for increasing the output of one of the motors and lowering the output of the other, the frequency of vibration also changes periodically. This may be sensed by the occupant as a hum. Accordingly, it is preferred that such control of the ECU 25, in which the output of one of the motor is decreased and the output of the other is increased, be carried out randomly.

(2) In the random switch control, the output ratio of the motor 21 or 22 of a steering speed ωs that is in the range of the natural vibration is minimized in such a range that the total output of the motors is maintained constant while the output ratio of the other is maximized. This further effectively inhibits vibration brought about by the range of the natural vibration.

(3) If the steering speed ωs of one of the motors 21, 22 corresponds to the range of the natural vibration and the required assist force is in the achievable range of the other motor, the ECU 25 controls operation of each actuator 23, 24 in such a manner that the other motor applies the assist force. This further effectively inhibits vibration caused by the range of the natural vibration.

The illustrated embodiments may be modified into the following forms.

In the first and second embodiments, the EPS 1 has the column actuator 24, which applies the assist force to the column shaft 8, as the steering force assist device applying the assist force to the steering shaft 3. However, the EPS 1 may be a pinion type EPS actuator that applies assist force to a pinion shaft.

In the first and second embodiments, the single ECU 25 controls both the rack actuator 23 and the column actuator 24. However, two ECUs may cooperate to control the corresponding actuators 23, 24.

Although the output characteristics of the motor 21 are different from those of the motor 22 in the first and second embodiments, the motors 21, 22 may have the same output characteristics. In this case, the assist force may be produced by a ratio in which the motors 21, 22 produce equal assist forces or a predetermined ratio.

Figure 10:
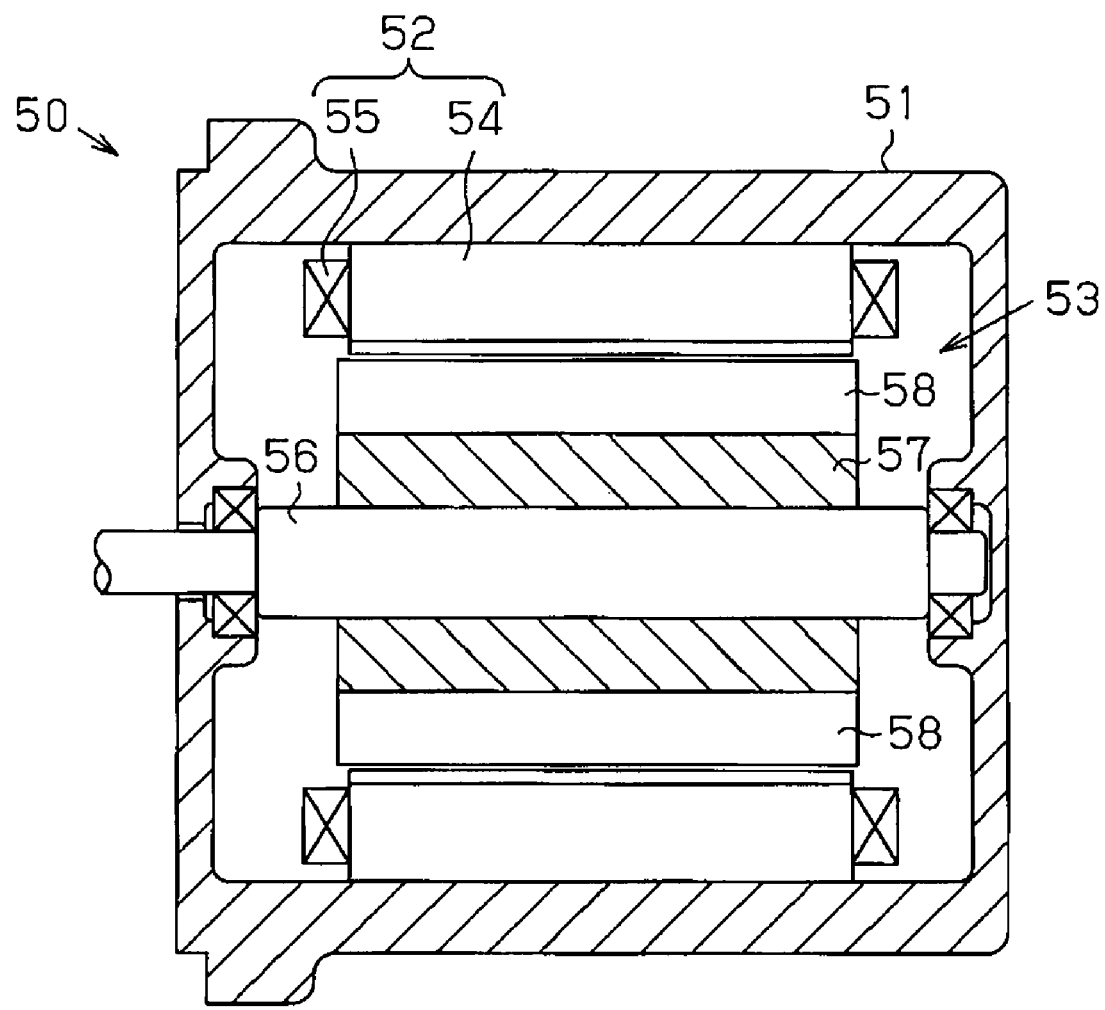
FIG. 10 is a schematic view showing the configuration of a reluctance motor.

Although the induction motor 30 is used as the non-permanent magnet motor in the first embodiment, a reluctance motor 50 illustrated in FIG. 10 may replace the induction motor 30. As illustrated in FIG. 10, the reluctance motor 50 has a stator 52 fixed to the inner circumference of a housing 51 and a rotor 53 supported rotatably at a position inward from the stator 52. The stator 52 is formed by a stator core 54 and a stator coil 55 wound around the stator core 54. The rotor 53 is configured by a rotary shaft (an output shaft) 56 and a rotor core 57 fixed to the outer circumference of the rotary shaft 56. A plurality of salient poles 58 radially project from the outer circumference of the rotor core 57. The salient poles 58 are formed in such a manner that a predetermined difference in inductance is provided based on the relationship between each salient pole 58 and the recess between the salient pole 58 and an adjacent one of the salient poles 58.

Specifically, in the reluctance motor 50, reluctance torque based on self-inductance and mutual inductance is generated in the rotor 53 by energizing the stator coil 55 synchronously with the rotational position of the rotor 53. The reluctance motor 50 also characteristically has no cogging torque. Accordingly, if the reluctance motor 50 is used as the non-permanent magnet motor, advantages equivalent to the advantages provided by the induction motor are obtained.

In the first and second embodiments, the EPS 1 has the two motors 21, 22 as the drive sources and the rack actuator 23 and the column actuator 24 as the steering force assist devices. However, the EPS 1 may include three or more motors as drive sources, and one or more than two steering force assist devices.

The two motors 21, 22 have different output characteristics in the second embodiment. Normally, the assist force is applied by the predetermined ratio corresponding to the output characteristics of the motors 21, 22. However, the assist force may be applied by employing one of the motors 21, 22 as a main motor (a main actuator) and the other as a sub motor (a sub actuator). Alternatively, as long as at least one motor has a range of the natural vibration different from those of other motors, motors with the same output characteristics may be employed.

In the second embodiment, if the steering speed of one of the motors 21, 22 corresponds to the range of the natural vibration and the required assist force exceeds the achievable range of the other motor, control by which the output of the motor with the steering speed that is in the range of the natural vibration is reduced and the output of the other motor is increased while the total output is maintained constant is carried out intermittently and randomly in terms of time. However, such random switch control may be carried out even if the required assist force is in the achievable range of the other motor. Also in this case, vibration caused by the range of the natural vibration is inhibited. By using this configuration, quietness of operation is improved without hampering the direct steering feel particularly if one of the motors 21, 22 is a main motor.

If the steering speed of one of the motors 21, 22 corresponds to the range of the natural vibration and the required assist force is in the achievable range of the other motor, operation of each actuator is controlled in such a manner that the assist force is applied with the other motor serving as the drive force. However, the assist force may be applied with the other motor serving as the drive source regardless of the achievable range of the motor. Also in this case, vibration caused by the range of the natural vibration is inhibited. If change of the assist force is considered, it is preferable to employ the random switch control in combination.

What is claimed is:

1. An electric power steering device comprising:
   a first steering force assist device that applies an assist force to a rack shaft to assist steering,
   a second steering force assist device that applies the assist force to a steering shaft, and
   control means that controls operation of each of the steering force assist devices by supplying drive power to a motor that drives the steering force assist device,
   wherein a first motor that drives the first steering force assist device is a permanent magnet motor,
   wherein a second motor that drives the second steering force assist device is a non-permanent magnet motor.

2. The electric power steering device according to claim 1, wherein the steering shaft is a column shaft and the second steering force assist device is provided in the column shaft.

3. The electric power steering device according to claim 1, wherein the non-permanent magnet motor used in the second steering force assist has a higher rotation speed than the permanent magnet motor used in the first steering force assist device, wherein the permanent magnet motor has a higher torque than the non-permanent magnet motor.

4. The electric power steering device according to claim 1, further comprising means for determining a required assist force, wherein if the required assist force is in an achievable range of the first steering force assist device, the control means controls the steering force assist devices in such a manner that the first steering force assist device applies the assist force to the rack shaft.

5. The electric power steering device according to claim 1, further comprising:
   determination means that determines a state of the steering including a steering direction,
   wherein, if the steering is a reverse steering and a required assist force is in an achievable range of the second steering force assist device, the control means controls the steering force assist devices in such a manner that the second steering force assist device applies the assist force to the steering shaft.

6. The electric power steering device according claim 1, further comprising means for determining a steering speed, wherein if a steering speed is less than or equal to a predetermined speed and a required assist force is in an achievable range of the second steering force assist device, the control means controls the steering force assist devices in such a manner that the second steering force assist device applies the assist force to the steering shaft.

7. The electric power steering device according to claim 1, further comprising means for determining a steering speed, wherein the first motor driving the first steering force assist device has a range of the natural vibration different from a range of the natural vibration of the second motor driving the second steering force assist device,
   wherein, if the steering speed of one of the motors is in the range of the natural vibration, the control means intermittently and randomly executes control for decreasing the output of the one of the motors and increasing the output of the other one of the motors.

8. The electric power steering device according to claim 7, wherein the control means minimizes the output ratio of the motor of a steering speed that is in the range of the natural vibration, and maximizes the output ratio of the other one of the motors.

9. The electric power steering device according to claim 1, further comprising means for determining a steering speed, wherein the first motor driving the first steering force assist device has a range of the natural vibration different from a range of the natural vibration of the second motor driving the second steering force assist device,
   wherein, if a steering speed of one of the motors is in the range of the natural vibration, the control means controls the steering force assist devices in such a manner that the assist force is applied by using the other motor as a drive source.

* * * * *